(12) United States Patent
Moore

(10) Patent No.: US 8,801,226 B2
(45) Date of Patent: Aug. 12, 2014

(54) PORTABLE LIGHT SYSTEM

(76) Inventor: Michael Moore, Ames, IA (US)

(*) Notice: Subject to any disclaimer, the term of this patent is extended or adjusted under 35 U.S.C. 154(b) by 54 days.

(21) Appl. No.: 13/589,682

(22) Filed: Aug. 20, 2012

(65) Prior Publication Data

US 2014/0049953 A1    Feb. 20, 2014

(51) Int. Cl.
*F21S 4/00* (2006.01)
*F21V 21/00* (2006.01)

(52) U.S. Cl.
USPC ... 362/249.1; 362/184; 362/190; 362/249.11; 362/419; 362/431

(58) Field of Classification Search
USPC .......... 362/184, 190, 191, 197–199, 249.07, 362/249.09, 249.1, 249.11, 418, 419, 431, 362/220

See application file for complete search history.

(56) References Cited

U.S. PATENT DOCUMENTS

| | | | |
|---|---|---|---|
| 4,523,256 A * | 6/1985 | Small | 362/249.09 |
| 7,810,964 B2 * | 10/2010 | Probasco | 362/190 |

* cited by examiner

*Primary Examiner* — Stephen F Husar
(74) *Attorney, Agent, or Firm* — Zarley Law Firm, P.L.C.

(57) ABSTRACT

A portable lighting system having an elongated support member, retractable legs, retractable light assemblies, and multiple mounting members that slidably move along the support member to cause the legs and light assemblies to move from a retractable position to an extended and support position and back.

6 Claims, 3 Drawing Sheets

PORTABLE LIGHT SYSTEM

BACKGROUND OF THE INVENTION

This invention is directed toward a portable lighting system and particularly to a lighting system that is retractable.

Lighting systems are known in the art and those that are used for traffic situations such as accidents, road side service, and construction typically are large, complex, expensive, and difficult to transport. Because of this, rarely is a lighting system available for a first responder to an accident or service call. As a result, this creates safety issues for the first responder as well as leads to potential traffic congestion. Accordingly, there is a need in the art for a lighting system that addresses these needs.

Therefore, an objective of the present invention is to provide a lighting system that is portable and easy to transport.

Another objective of the present invention is to provide a lighting system that is retractable.

A still further objective of the present invention is to provide a lighting system that is easy to set up.

These and other objectives will be apparent to one of ordinary skill in the art based upon the following written description, drawings, and claims.

SUMMARY OF THE INVENTION

A portable lighting system having an elongated support member with retractable legs at one end and a control box at the opposite end. Pivotally connected to the control box is at least one light assembly. A first and a second mounting member are slidably mounted to the support member. The first mounting member is connected to the legs such that as the mounting member moves along the support member the legs move from a retractable position to a support position and back. The second mounting member is connected to the light assembly(s) such that as the second mounting member moves along the support member, the light assembly moves from a retracted position to an extended position and back.

DETAILED DESCRIPTION OF THE PREFERRED EMBODIMENTS

Figure 1:
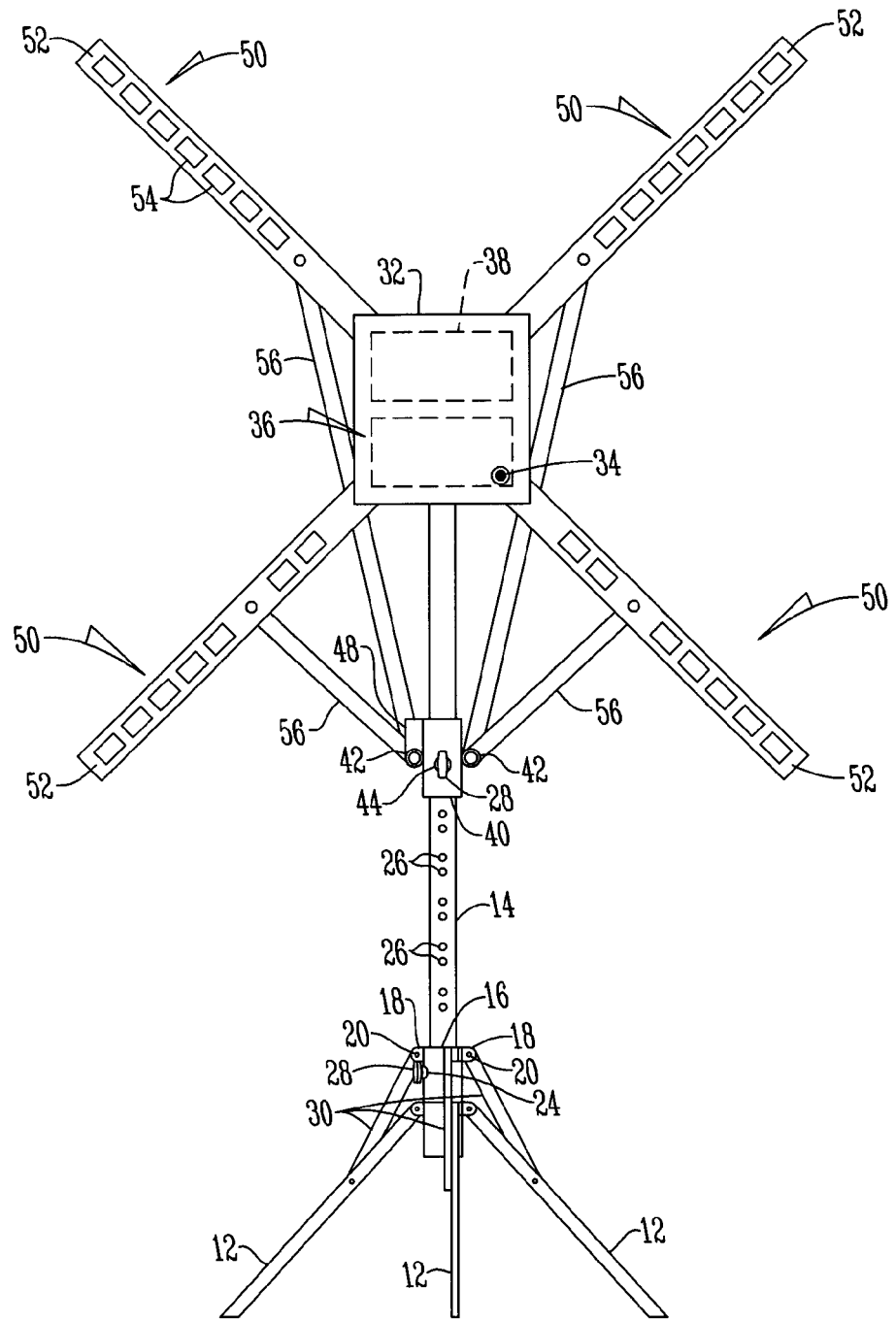
FIG. 1 is a front view of a lighting system.

Referring to the Figures, a portable light system 10 has a plurality of leg members 12 that are pivotally connected to a support member 14. Preferably, the support member 14 is comprised of three sections that fit within one another. In its original retracted position the length of the support member is 48 inches and in its fully expanded position will be 60 inches. Slidably mounted to the support member 14 is a first mounting member 16. Mounting member 16 has a plurality of flanges 18 that extend outwardly with each flange 18 having an opening 20. Mounting member 16 also has a pull pin mount 22 and opening 24 that aligns with openings 26 on the support member 14 to receive a pull pin 28.

Pivotally connected to the flanges 18 at one end are a plurality of guide bars 30. The guide bars 30 are pivotally connected to the leg members 12 at the opposite end.

Attached to the opposite end of the support member 14 is a control box 32 that has a switch 34 electrically connected to a circuit board 36 which is connected to a power source such as a battery 38. Slidably mounted between the control box 32 and the first mounting member 16 is a second mounting member 40. The second mounting member 40 has a pair of bushing braces 42 and a pull pin mount 44. The pull pin mount 44 is aligned with an opening 46 in mounting member 40 that aligns with openings 26 on the support bar 14 to receive a pull pin 28. Also attached to mounting member 40 is a handle 48.

Pivotally connected to the control box 32 is a plurality of light assemblies 50. The light assemblies 50, which are electrically connected to the circuit board 36, have an elongated partial housing 52 and a plurality of lights 54 dispersed along housing 52. Pivotally connected to the light assemblies 50, are a plurality of spreader bars 56 which are pivotally connected to the bushing braces 42 at an opposite end.

Figure 2:
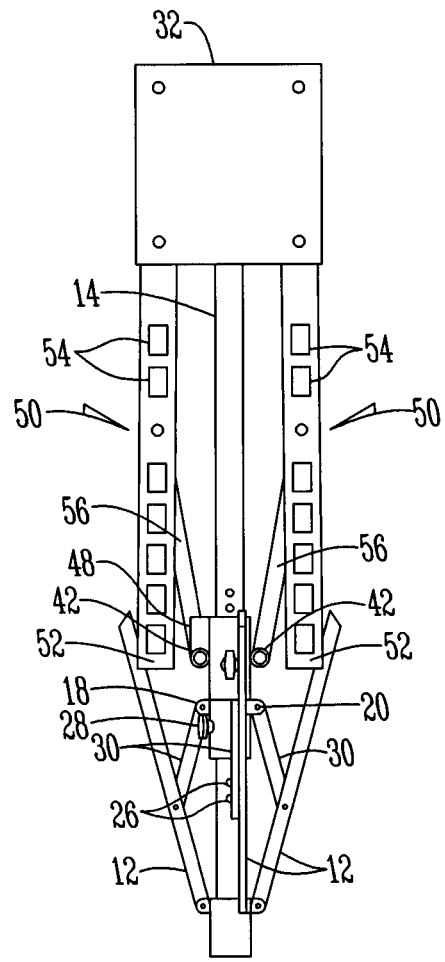
FIG. 2 is a front view of a lighting system.
Figure 3:
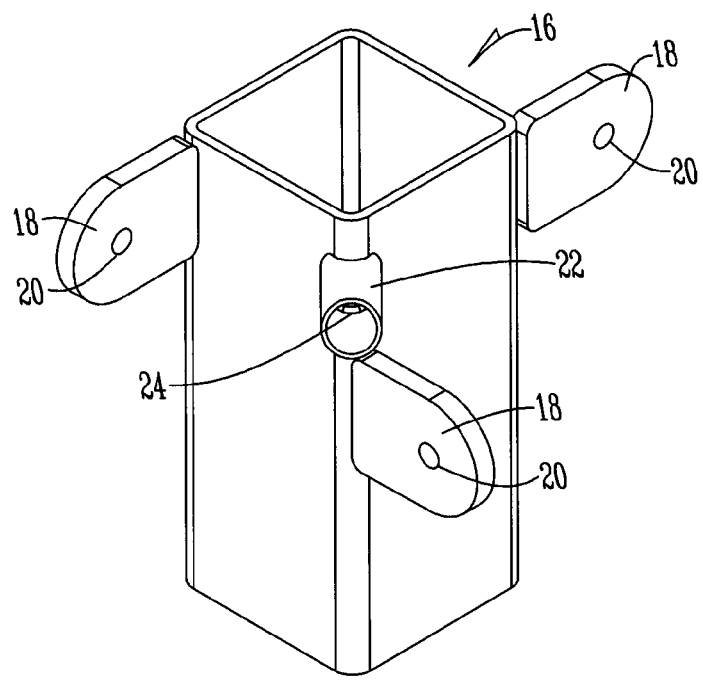
FIG. 3 is a perspective view of a mounting member.
Figure 4:
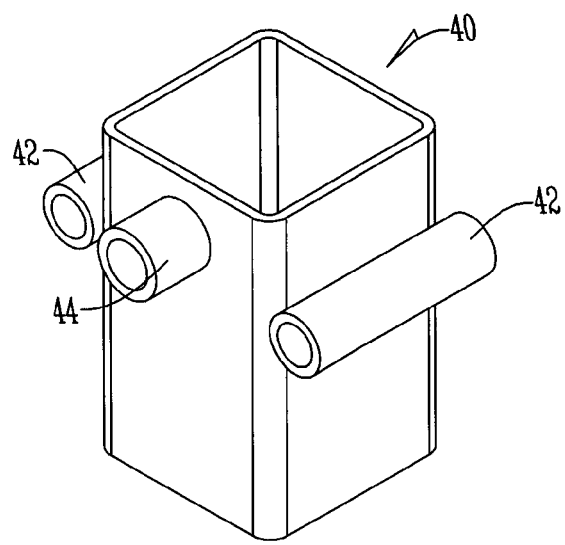
FIG. 4 is a perspective view of a mounting member.

When in a retracted position, as shown in FIG. 2, first mounting member 16 and second mounting member 40 are positioned close to one another along support member 14. As such leg members 12 and light assemblies 50 are retracted to a position generally parallel with and between the ends of the support member 14.

To move to a working upright position, pull pin 18 is removed from openings 24 and 26 and mounting member 16 is slid along support member 14 away from mounting member 40 toward the end of the support member 14. As mounting member 16 is moved the guide bars 30 pivot in relation to flanges 18 causing the leg members to move downwardly and outwardly in relation to the support member 14 until the legs are in a support position. Once in a support position, pull pin 28 is inserted through openings 24 and 26 to lock the legs in a support position.

Next, pull pin 28 on the second mounting member 40 is removed from openings 46 and 26 so that, using handle 48, the second mounting member 40 is slid along support member 14 away from support member 16 toward control box 32. As mounting member 40 is moved, spreader bars 56 pivot in relation to braces 42 causing the light assemblies 50 to move upwardly and outwardly to an extended position. Once in an extended position, the pull pin 28 is inserted through openings 46 and 26 to lock the light assemblies in an extended position. Once locked, switch 34 is activated which activates the lights and desired pattern as determined by the circuit board 36.

Accordingly, a portable light system has been disclosed that, at the very least, meets all the stated objectives.

I claim:

1. A portable light system, comprising;
    a support member having a first and a second mounting member that are slidably mounted to the support member;
    a plurality of legs pivotally connected to the support member and pivotally connected to the first mounting member via a guide bar;
    a control box mounted to the support member; and
    at least one light assembly pivotally mounted to the control box and pivotally connected to the second mounting member via a spreader bar.

2. The system of claim 1 wherein the first mounting member has a plurality of outwardly extending flanges pivotally connected to a plurality of guide bars.

3. The system of claim 1 wherein the second mounting member has a pair of bushing braces pivotally connected to a plurality of spreader bars.

4. The system of claim 1 wherein both the first and second mounting members have pull pin mounts that receive a locking pull pin.

5. The system of claim 1 wherein the first mounting member has an opening that aligns with openings on the support member such that a pull pin is inserted therethrough to lock the first mounting member in a position along the support member.

6. The system of claim 1 wherein the second mounting member has an opening that aligns with openings on the support member such that a pull pin is inserted therethrough to lock the first mounting member in a position along the support member.

* * * * *